United States Patent [19]

Ponticello et al.

[11] 3,883,518

[45] May 13, 1975

[54] 3-METHYLENE CEPHALOSPORINS

[75] Inventors: Gerald S. Ponticello, Bridgewater Township, Somerville County; F. Edward Roberts, Princeton; Leonard M. Weinstock, Belle Mead, all of N.J.

[73] Assignee: Merck & Co., Inc., Rahway, N.J.

[22] Filed: May 15, 1972

[21] Appl. No.: 253,221

[52] U.S. Cl............................ 260/243 C; 424/246
[51] Int. Cl............................................ C07d 99/24
[58] Field of Search ................................ 260/243 C

[56] References Cited
UNITED STATES PATENTS

| | | | |
|---|---|---|---|
| 3,546,219 | 12/1970 | Long et al. | 260/243 C |
| 3,660,396 | 5/1972 | Wright | 260/243 C |
| 3,705,897 | 12/1972 | Murphy | 260/243 C |
| 3,716,465 | 2/1973 | Heusler et al. | 260/243 C |
| 3,733,320 | 5/1973 | Pines et al. | 260/243 C |

*Primary Examiner*—Nicholas S. Rizzo
*Attorney, Agent, or Firm*—Walter Patton; Julian S. Levitt; J. Jerome Behan

[57] ABSTRACT

3-Methylene cephalosporins and their salts and esters which are useful as intermediates in the preparation of antibiotics. The title compounds are prepared by the reduction of a 3-carbamoyloxymethyl- or 3-acetoxymethyl cephalosporin.

3 Claims, No Drawings

3-METHYLENE CEPHALOSPORINS

This invention is directed to novel cephalosporin compounds having a 3-methylene substituent and also to a novel process for preparing said compounds.

The 3-methylene cephalosporins and their salts and esters are useful as intermediates to prepare cephalosporin antibiotics.

The cephalosporin compounds prepared from the novel products of this invention are effective against gram-negative bacteria including *Escherichia coli*, *Proteus vulgaris*, *Proteus mirabilis*, *Proteus morganii*, *salmonella schottmuelleri*, *Klebsiella pneumoniae AD*, *Klebsiella pneumoniae B*, and *Paracolobactrum arizoniae* and gram-positive bacteria including *Staphylococcus aureus*, *Streptococcus pyogenes* and *Diplococcus pneumoniae*.

The cephalosporins prepared from these novel intermediates are also useful in removing susceptible microorganisms from pharmaceutical, medical and dental equipment and as bactericides in industrial applications, for example, in water based paints and in the white water of paper mills to inhibit the growth of harmful bacteria.

The novel compounds of this invention have the following structural formula:

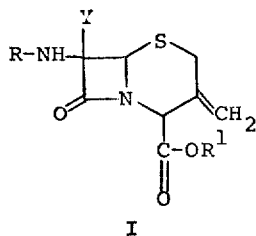

I wherein R is an acyl radical, for example, an aliphatic aromatic, heterocyclic, araliphatic or heterocyclic aliphatic carboxylic acid radical of the formula;

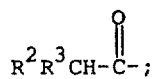

$R^1$ is hydrogen or a a blocking group and Y is hydrogen or an organic radical, for example, any radical presently known in the cephalosporin art which is stable under the reaction conditions employed. Examples of these radicals are hydroxy or substituted hydroxy groups; a hydrocarbyl or substituted hydrocarbyl group; cyano or a carbonyl containing substituent or a nitrogen bonded group.

The following list is an illustration of the various Y radicals which can be employed; however, the list is not meant to be exhaustive for, as mentioned previously, any known cephalosporin having a 3-acetoxymethyl or 3-carbamoyloxymethyl radical may be employed in this reaction, the only limitation being that the Y function be stable to the reaction conditions employed.

Y can be a radical of the formula: $OY^1$ wherein $Y^1$ is straight or branched chain lower alkyl of 1–6 carbon atoms, preferably methyl or ethyl, lower alkenyl of 3–6 carbon atoms, lower alkynyl of 3–6 carbon atoms, monocyclic aryl such as phenyl or a monocyclic aralkyl such as benzyl. When Y is hydrocarbyl, it can be lower alkyl of 1–6 carbon atoms, lower alkenyl of 3–6 carbon atoms, lower alkynyl of 3–6 carbon atoms, monocyclic aralkyl, cycloalkyl of 5–6 carbon atoms or a monocyclic aryl group. when Y is a carbonyl substituent, it has the formula:

wherein $Y^2$ is hydroxy, amino, substituted amino, lower alkyl or 1–6 carbon atoms and the like and the nontoxic pharmacologically acceptable salts thereof.

Those compounds wherein Y is methoxy and the acyl radical, R, is of the formula:

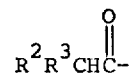

wherein $R^2$ and $R^3$ are as defined below, represent a preferred group of radicals because of the generally enhanced antibiotic activity of the $\Delta^3$ cephem compounds containing these radicals. $R^2$ represents hydrogen, halo, amino, hydroxy, tetrazolyl or carboxy. $R^3$ represents phenyl, substituted phenyl, a 5- or 6-membered monocyclic heterocycle containing one or more oxygen, sulfur or nitrogen hetero atoms in the ring such as furyl, thienyl, thiazolyl, isothiazolyl, oxadiazolyl and the like, substituted heterocycles, phenylthio, heterocyclic or substituted heterocyclic thio groups or cyano. The substituents can be halo, carboxymethyl, aminomethyl, methoxy or methyl. Expecially preferred are those acyl radicals where $R^2$ is hydrogen, amino or carboxy and $R^3$ is phenyl or a 5- or 6-membered heterocyclic ring containing from 1 to 2 sulfur, oxygen or nitrogen atoms. Examples of these preferred R radicals are phenylacetyl, 3-bromophenylacetyl, p-aminomethylphenylacetyl, 4-carboxymethylphenylacetyl, 2-furylacetyl, 3-furylacetyl, 5-chlorothienylacetyl, 5-methoxythienylacetyl, 3-thienylacetyl, 4-methylthienylacetyl, 3-isothiazolylacetyl, 4-methoxyisothiazolylacetyl, 4-isothiazolylacetyl, 3-methylisothiazolylacetyl, 5-isothiazolylacetyl, 3-chloroisothiazolylacetyl, 4-acetyl, phenylthioacetyl, 4-pyridylthioacetyl, cyanoacetyl, tetrazolylacetyl, α-fluorophenylacetyl, D-phenylglycyl, 4-hydroxy-D-phenylglycyl, 2-thienylglycyl 3-thienylglycyl, phenylmalonyl, 3-chlorophenylmalonyl, 2-thienylmalonyl, 3-thienylmalonyl, α-hydroxyphenylacetyl and α-tetrazolylphenylacetyl. An especially preferred substituent is 2-thienylacetyl.

The novel process of this invention comprises treating a 3-carbamoyloxymethyl- or 3-acetoxymethyl-7β-acylamido-7α-(Y-substituted)-3-cephem-4-carboxylic acid ester with a reducing agent, for example, activated zinc dust or zinc dust in the presence of formic acid. [The zinc is activated by washing it with dilute hydrochloric acid, removing any trace of hydrochloric acid and then drying the zinc dust under vacuum.] Any solvent which is inert or substantially inert to the reactants may be employed with the activated for example, tetrahydrofuran, ethyl acetate, dioxane, acetic acid and the like. When a solvent other than acetic acid is employed, it has been found desirable to add a small amount of acetic acid (up to 10% by volume) to increase the yields. The reaction may be conducted at a temperature in the range of from about 0° to 50°C. In general the reaction is conducted at ambient temperature. The reaction time is generally from about 10 minutes to about 60 minutes. The following equation illustrates this reaction:

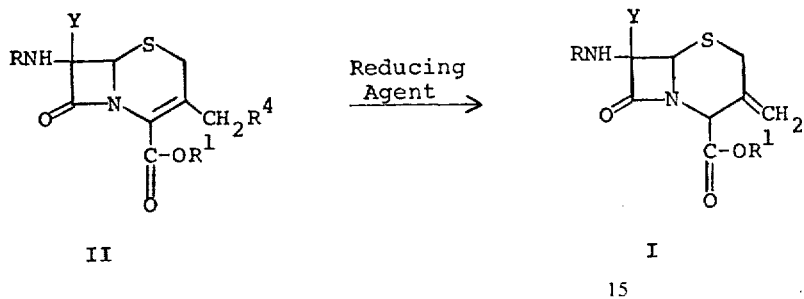

II           I wherein R, $R^1$ and Y are as defined above and $R^4$ is acetoxy or carbamoyloxy.

In carrying out this reaction the 4-carboxy group and other carboxy, amino or hydroxy groups in the nucleus are preferably protected with an ester group ($R^1$ in the formulas), for example, an ester group selected from trichloroethyl, tert-butyl, benzoylmethyl, p-methoxybenzyl, benzyl, benzhydryl, trimethylsilyl, methoxymethyl, benzoylmethylcarbonyloxy, tert-butylcarbonyloxy and the like. These ester groups may be removed by various methods, for example, the benzhydryl or phenylalkyl may be removed by hydrogenation in the presence of a catalyst such as palladium-on-carbon or by treatment with a strong organic or inorganic acid. The tert-butyl or methoxymethyl groups may also be removed by treatment with a strong organic or inorganic acid. Examples of these acids are hydrochloric acid, sulfuric acid, boron trifluoride etherate, formic acid, trifluoroacetic acid, trichloroacetic acid, nitrobenzoic acid and the like.

Under the reaction conditions employed some of the above-mentioned ester groups may be cleaved to afford the free acid. Therefore, if it is desired to retain the ester function, care should be taken to chose those groups which will not be cleaved.

The 3-methylene cephalosporins are useful as intermediates in the preparation of other cephalosporins having antibiotic activity or in the preparation of the desirable 3-bromomethyl substituted cephalosporin which can be reacted with a nucleophilic substance to obtain a 3-"functionalized methyl" cephalosporin product. Numerous examples of the nucleophilic substances which can be employed are already known in the art.

The 3-substituted methyl cephalosporins (III, infra) are prepared by treating the 3-methylene cephalosporin (I, infra) with a reagent which adds across the double bond of the 3-methylene group, for example, halogens such as bromine and the like or haloazides such as bromine azide and the like. This reaction is conducted under free radical conditions employing polar solvents such as chloroform, methylene chloride and the like. The 3-halo-3-substituted methyl cephalosporins (IV, infra) are treated with a weak base such as collidine, sodium acetate, calcium oxide, dimethylformamide and the like to afford the desired 3-substituted methyl cephalosporin (III). The following equation illustrates this process:

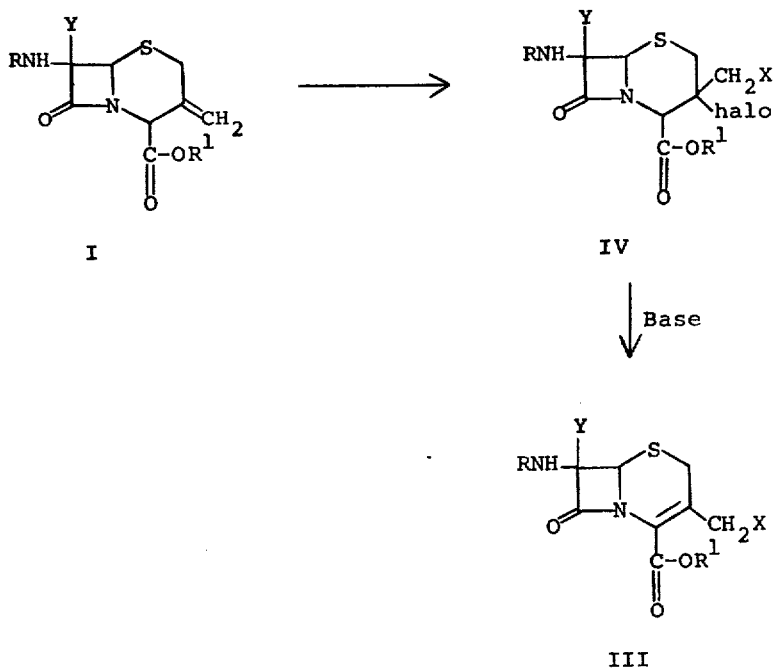

I           IV

III wherein R, R¹ and Y are as defined above and X is halo such as bromo and the like or azido.

Included within the scope of this invention are the salts of the instant products. In general, any base which will form a salt with the 3-methylene cephalosporins is considered as being within the scope of this invention, for example, salts prepared from alkali metal and alkaline earth metal bases.

Also included in addition to the esters described above are other ester derivatives which are prepared by conventional methods. These include the lower alkyl esters such as methyl ester, ethyl ester and the like.

These salts and esters of 3-methylene-7β-acylomido-7α-(Y-substituted)-cepham-4-carboxylic acid are considered to be the functional equivalent of the corresponding acid.

The 3-carbamoyloxymethyl- and 3-acetoxymethyl cephalosporins (II) employed as starting materials in this invention are disclosed in Belgian Pat. No. 768,528.

The following examples illustrate the novel process of this invention. However, the examples are illustrative only and it will be apparent to those skilled in the art that other reagents and solvents similar to those described in the following examples may be employed to afford similar results.

EXAMPLE 1

3-Methylene-7β-thienylacetamido-7α-methoxycepham-4-carboxylic Acid

Step A: Methoxymethyl 3-methylene-7β-thienylacetamido-7α-methoxy-cepham-4-carboxylate To a solution of methoxymethyl 3-carbamoyloxymethyl-7β-thienylacetamido-7α-methoxy-3-cephem-4-carboxylate (40 mg.) in tetrahydrofuran (4ml.) containing acetic acid (0.2 ml.) is added activated zinc dust (1.8 g.) [zinc dust is activated by washing several times with 5% hydrochloric acid, and then washing successively with water, methanol and then ether and finally drying the zinc dust under vacuum.] The reaction mixture is stirred at room temperature for 20 minutes. The reaction mixture is filtered and the zinc cake washed with tetrahydrofuran. The solvent is removed under vacuum and the residue dissolved in ethyl acetate and washed with a 5% sodium bicarbonate solution. The ethyl acetate solution is dried over magnesium sulfate, filtered and the ethyl acetate removed under vacuum to afford methoxymethyl 3-methyelne-7β-thienylacetamido-7α-meethoxycepham-4-carboxylate.

Mass Spectrum: (M₊) 412; UV: λmax 270 A% 24; λmax 232 A% 211;

NMR (CDCl₃) — (S, 6H, 3.43 ppm OCH₃); (S, 2H, 3.9 ppm

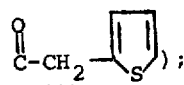

(m, 5Ha 5.2 ppm

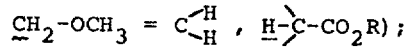

(m, 3H, 7.1 ppm

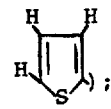

(S, 1H m - 7.65 ppm N-H).

Step B: 3-Methylene-7β-thienylacetamido-7α-methoxy cepham-4-carboxylic Acid

To a solution of methoxymethyl 3-methylene-7β-thienylacetamido-7α-methoxycepham-4-caraboxylate (40mg.) in tetrahydrofuran (4ml.) is added a solution of acetic acid (0.4 ml.) and water (0.2 ml.). The reaction mixture is stirred at room temperature for 2 hours. The solvents are removed under vacuum and the residue is dissolved in ethyl acetate and washed with water. The ethyl acetate solution is dried over magnesium sulfate, filtered and the solvent removed under vacuum to afford 3-methylene-7β-thienylacetamido-7α-methoxycepham-4-carboxylic acid.

NMR: (CMSOd6): (S, 5H, 3.35 ppm —S—CH₂—, OCH₃); (S, 2H, 3.8 ppm

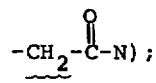

(S, 1H, 5,15 ppm C₆-H): (m, 3H, 5.25 ppm =

H-C-CO₂H); (S, 1H, 9.43 ppm

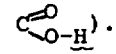

EXAMPLE 2

3-methylene-7β-thienylacetamido-7α-methoxycephem-4-carboxylic Acid

To a solution of 3-carbamoyloxymethyl-7β-thienylacetamido-7α-methoxy-3-cephem-4-carboxylic acid (100 mg.) in tetrahydrofuran (10 ml.) containing acetic acid (1ml.) is added activated zinc (1.8 g.). The reaction mixture is stirred overnight at room temperature. The reaction mixture is filtered and the zinc cake washed with tetrahydrofuran. The solvent is removed from the filtrate under vacuum to afford a mixture of the starting material and final product. The mixture is triturated with dry ethyl acetate in which the desired product is soluble and the starting material is insoluble. The ethyl acetate solution is filtered and the solvent removed under vacuum to afford 3-methylene-7β-thienylacetamido-7α-methoxycephem-4-carboxylic acid. Further purification of the product is done on preparative thin layer chromatography using as the solvent system a mixture of benzene, methanol and acetic acid in a ratio of 50:10:6.

EXAMPLE 3

Methoxymethyl 3-Melboxymethylbromomethyl-7β-thienylacetamido-7α-methoxy-3-cephem-4-carboxylate Methoxymethyl 3-methylene-7-thienylacetamido-7-methoxycepham-4-carboxylate is dissolved in methylene chloride (10 ml.) and cooled to 0°C. To this solution is added bromine (1 mm.) in methylene chloride (10 ml.). After 30 minutes at 0°C. the solvent is removed under vacuum to afford methoxymethyl 3-bromomethyl-3-bromo-7-thienylacetamido-7-methoxycepham-4-carboxylate. This compound is dissolved in dimethylformamide (10 ml.) and sodium acetate (1 mm.) is then added. The reaction mixture is heated to 60°c. for 4 hours. The reaction mixture is diluted with ethyl acetate (100 ml.) and is washed with water to remove the dimethylformamide. The solution is concentrated under vacuum to afford Methoxymethyl 3-bromomethyl 7β-thienylacetamido-7α-methoxy-3-cephem-4-carboxylate.

EXAMPLE 4

3-Azidomethyl-7β-thienylacetamido-7α-methoxy-3-cephem-4-carboxylic Acid

Step A: Methoxymethyl 3-azidomethyl-3-bromo-7-thienylacetomido-7-methoxycepham-4-carboxylate Methoxymethyl 3-methylene-7β-thienylacetamido-7α-methoxycephem-4-carboxylated (1 mm.) is dissolved in methylene chloride (10 ml.) and treated with a solution of bromine azide (1 mm.) in methylene chloride (10 ml.). After the disappearance of the red color the solvent is removed under vacuum to afford methoxymethyl 3-azidomethyl-3-bromo-7-thienylacetamido-7-methoxycepham-4-carboxylate.

Step B: Methoxymethyl 3-azidomethyl-7β-thienylacetomido-7α-methoxy-3-cephem-4-carboxylate Methoxymethyl 3-azidomethyl-3-bromo-7-thienylacetamido-7-methoxycepham-4-carboxylate is dissolved in dimethylformamide (10 ml.) and sodium acetate (4mm.) is added. The solution is heated at 60°C. for 1 hour and then diluted with ethyl acetate (50 ml.). The solution is washed with water to remove the dimethylformamide. The solution is then concentrated under vacuum to afford methoxymethyl 3-azidomethyl-7β-thienylacetamido-7α-methoxy-3-cephem-4-carboxylate.

Step C: 3-Azidomethyl-7β-thieeylacetamido-7α-methoxy-3-cephem-4-carboxylic Acid Methoxymethyl 3-azidodmethyl-7β-thienylacetamido-7α-methoxy-3-cephem-4-carobyxlate is dissolved in dimethylformamide (10 ml.) and methanol (2 ml.) and concentrated hydrochloric acid (2Ml.) i added at 0°C. The reaction mixture is allowed to stand for 90 minutes at 0° to 5°C. at which time a sodium bicarbonate solution (2.5 g.) in water (25 ml.) is added. The alkaline solution is washed with ethyl acetate and the ethyl acetate solution is discarded. The solution is then cooled to 0°C. and layered over with ethyl acetate (15 ml.). The pH is adjusted to 2 with 10% hydrochloric aicd.d The ethyl acetate solution is collected, dried over magnesium sulfate, filtered and the solvent removed over vacuum to afford 3-azidomethyl-7β-thienylacetamido-7α-methoxy-3-cephem-4-carboxylic acid.

UV: λmax. 263 A% 200
IR: (β-lactam C=O) 1775 cm$^{-1}$.
(—N$_3$) 2100 cm$^{-1}$

By following substantially the procedures described in Examples 1–4, all of the products of this invention may be prepared. The following equation, together with Table I, indicate the starting materials, intermediates and products which may be prepared by this process:

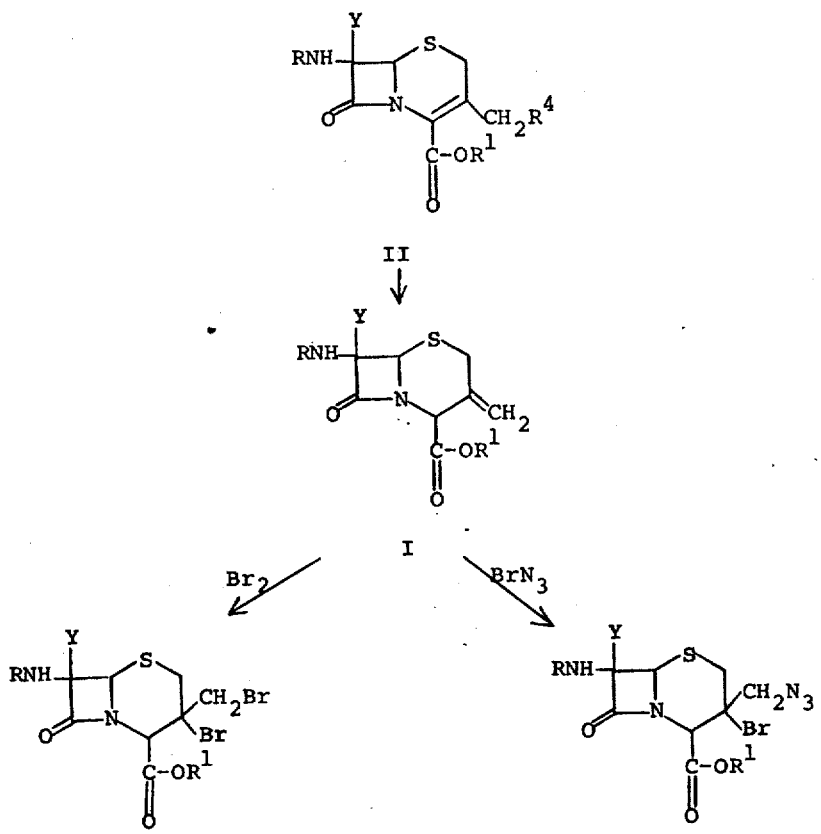

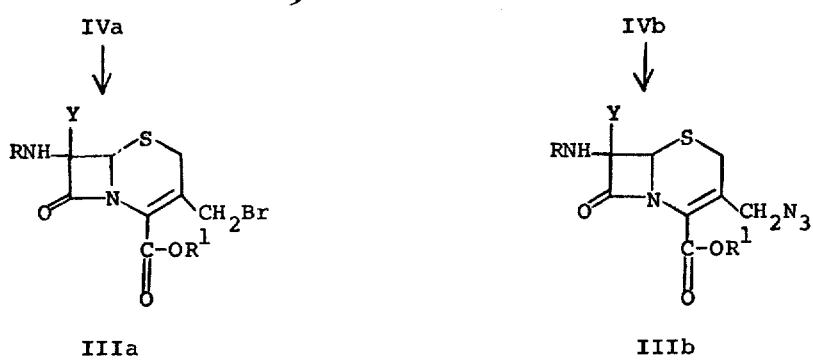
TABLE I
| Ex. No. | R | R¹ | R⁴ | Y |
|---|---|---|---|---|
| 5 | thiophen-2-yl-CH₂C(=O)- | -C(CH₃)₃ | -OC(=O)NH₂ | H |
| 6 | " | -CH(φ)₂ | -OC(=O)CH₃ | -CH₃ |
| 7 | " | -CH₂OCH₃ | -OC(=O)NH₂ | -OCH₃ |
| 8 | phenyl-CH(NHCO₂H)C(=O)- | -C(CH₃)₃ | " | " |
| 9 | furan-2-yl-CH₂C(=O)- | -CH(φ)₂ | " | -OC₂H₅ |
| 10 | HO-C₆H₄-CH(NHCO₂H)C(=O)- | " | " | -OCH₃ |
| 11 | thiazol-2-yl-CH₂C(=O)- | -H | " | " |
| 12 | phenyl-(1H-1,2,3-triazol-4-yl)-CH-C(=O)- | -CH₂-C₆H₄-OCH₃ | " | " |

TABLE I
(continued)

| Ex. No | R | R¹ | R⁴ | Y |
|---|---|---|---|---|
| 13 | PhCH(CO₂H)C(O)- | -CH(φ)₂ | " | " |
| 14 | (2-thienyl)CH(CO₂H)C(O)- | -C(CH₃)₃ | -OC(O)NH₂ | -OCH₃ |
| 15 | (3-bromophenyl)CH₂C(O)- | -H | " | " |
| 16 | (3-bromophenyl)CH₂C(O)- | -C(CH₃)₃ | " | " |
| 17 | HO₂CNHCH₂-C₆H₄-CH₂C(O)- | -CH(φ)₂ | " | " |
| 18 | PhCH₂C(O)- | -CH₂-C₆H₄-OCH₃ | -OC(O)CH₃ | H |
| 19 | (2-furyl)CH₂C(O)- | -CH(φ)₂ | " | -CH₂OCH₃ |
| 20 | (3-furyl)CH₂C(O)- | -CH₂OCH₃ | " | -OCH₃ |
| 21 | (5-chloro-2-thienyl)CH₂C(O)- | -C(CH₃)₃ | -OC(O)NH₂ | " |
| 22 | (5-methyl-2-thienyl)CH₂C(O)- | -CH₂-C₆H₄-OCH₃ | " | " |
| 23 | (isothiazolyl)CH₂C(O)- | -CH₂OCH₃ | " | " |
| 24 | (3-methoxyisothiazol-4-yl)CH₂C(O)- | -CH₂OCH₃ | -OCH₃ | -OC(O)NH₂ |
| 25 | (isothiazol-4-yl)CH₂C(O)- | -C(CH₃)₃ | " | " |

TABLE I
(continued)

| Ex. No. | R | R¹ | R⁴ | Y |
|---|---|---|---|---|
| 26 | 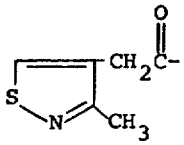 4-methylthiazol-5-yl-CH₂C(O)- | -CH(φ)₂ | -OC(O)CH₃ | " |
| 27 | 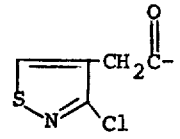 3-chloroisothiazol-4-yl-CH₂C(O)- | -CH₂-C₆H₄-OCH₃ | " | " |
| 28 | 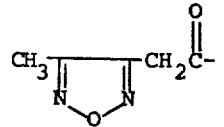 3-methylisoxazol-5-yl-CH₂C(O)- | -CH₂OCH₃ | -OC(O)NH₂ | " |
| 29 | 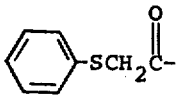 φ-SCH₂C(O)- | -C(CH₃)₃ | -OC(O)CH₃ | " |
| 30 | 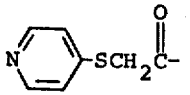 (pyridin-4-yl)-SCH₂C(O)- | " | -OC(O)NH₂ | " |
| 31 | CNCH₂C(O)- | -CH(φ)₂ | -OC(O)CH₃ | " |
| 32 |  tetrazol-1-yl-CH₂C(O)- | " | -OC(O)NH₂ | " |
| 33 | 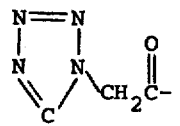 φ-CHF-C(O)- | " | " | " |
| 34 | 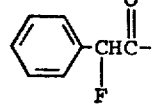 2-thienyl-CH(NHCO₂H)-C(O)- | -H | -OC(O)CH₃ | -OCH₃ |
| 35 | 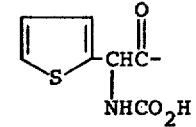 2-thienyl-CH(NHCO₂H)-C(O)- | -CH₂-C₆H₄-OCH₃ | -OC(O)NH₂ | " |
| 36 | 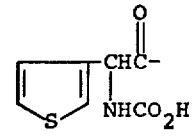 2-thienyl-CH(CO₂H)-C(O)- | -C(CH₃)₃ | -OC(O)CH₃ | " |

TABLE I
(continued)

| Ex. No. | R | R¹ | R⁴ | Y |
|---|---|---|---|---|
| 37 |  PhCH₂C(O)- | -CH₂OCH₃ | -OC(O)NH₂ | " |
| 38 | 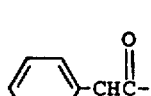 PhCH(CO₂H)C(O)- | -CH(φ)₂ | " | " |
| 39 |  PhCH₂C(O)- | -CH₂OCH₃ | -OC(O)CH₃ | " |

What is claimed is:

1. A compound of the formula:

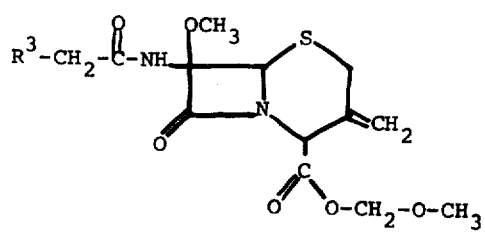

or

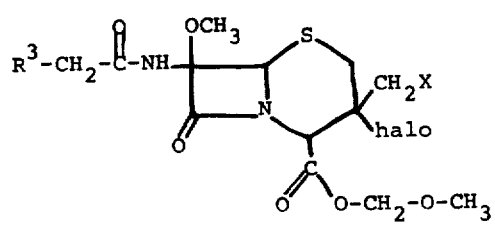

wherein $R^3$ is furyl or thienyl; and X is halo or azido.

2. A compound according to claim 1 named methoxymethyl 3-methylene-7β-thienylacetamido-7α-methoxycepham-4-carboxylate.

3. A compound according to claim 1 named methoxymethyl 3-methylene-7β-furylacetamido-7α-methoxycepham-4-carboxylate.

* * * * *